July 1, 1969   E. A. CARLSON   3,452,386
CASTER SOCKET ASSEMBLY
Filed Feb. 27, 1967
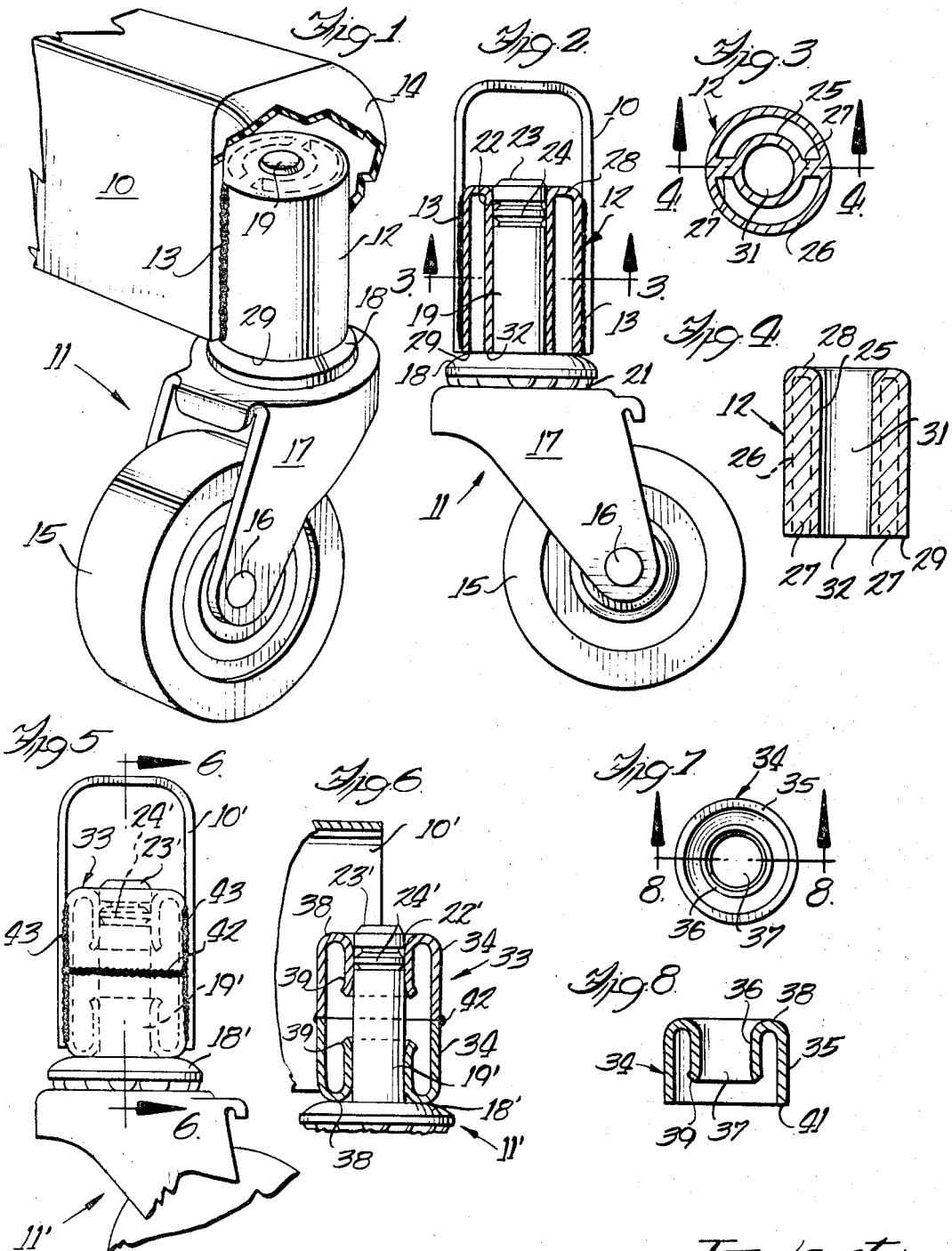
Inventor
Evert A. Carlson
by Wilson & Geppert
Atty's United States Patent Office 3,452,386
Patented July 1, 1969

3,452,386
CASTER SOCKET ASSEMBLY
Evert A. Carlson, Rockford, Ill., assignor to Keystone Consolidated Industries, Inc., Rockford, Ill., a corporation of Delaware
Filed Feb. 27, 1967, Ser. No. 618,658
Int. Cl. B60b 33/00
U.S. Cl. 16—39                6 Claims

ABSTRACT OF THE DISCLOSURE

A caster socket assembly for a ball bearing caster for use on an office chair base with the socket being welded to the chair base and receiving the stem of a ball bearing caster utilizing a spring friction ring to retain the stem in the socket. The socket is formed of either a double-walled cylindrical member having the walls joined at the upper end in an inverted U-shaped portion and joined on opposite sides with radial webs, or a pair of U-shaped cups joined edge to edge.

The present invention relates to an office chair caster socket assembly and more particularly to a simplified socket assembly for a caster stem having a spring friction ring with the socket being welded to the open end of the chair base leg.

Among the objects of the present invention is the provision of a caster socket assembly for an office chair where the socket is permanently secured to the open end of the chair leg as by welding. The socket provides an outer wall secured to the chair leg and an inner wall forming a bearing socket for the stem of the caster having a friction ring thereon.

Another object of the present invention is the provision of a caster socket assembly having a one-piece socket adapted to be secured to the chair leg. The one-piece socket includes a pair of concentric cylindrical walls joined along their length by a pair of opposed radial webs and joined at the upper end in an inverted U-shaped portion. The outer wall is secured to the chair leg, and the inner concentric wall forms a cylindrical passage providing the socket receiving the stem of a ball bearing caster.

A further object of the present invention is the provision of another embodiment of caster socket assembly utilizing a pair of U-shaped cups having concentric inner and outer walls. Each cup has an outer wall of greater length than the inner wall with the outer edges of the outer walls welded together. The joined outer walls are welded to the chair leg while the inner walls are axially spaced and form the socket receiving the caster stem.

Further objects are to provide a construction of maximum simplicity, efficiency, economy and ease of assembly, and such further objects, advantages and capabilities as will later more fully appear and are inherently possessed thereby.

In the drawing:

FIGURE 1 is a perspective view of a portion of a leg of an office chair having a caster and caster socket mounted therein.

FIG. 2 is a vertical cross sectional view of the caster socket assembly with the caster being shown in side elevation.

FIG. 3 is a horizontal cross sectional view through the caster socket taken on the line 3—3 of FIG. 2.

FIG. 4 is a vertical cross sectional view of the caster socket taken on the line 4—4 of FIG. 3.

FIG. 5 is a front elevational view of another embodiment of caster socket assembly secured to a leg of an office chair.

FIG. 6 is a vertical cross sectional view of the caster socket assembly taken on the line 6—6 of FIG. 5 with the caster shown in elevation.

FIG. 7 is an end elevation of one socket cup of the socket assembly of FIGS. 5 and 6.

FIG. 8 is a vertical cross sectional view of the socket cup taken on the line 8—8 of FIG. 7.

Referring more particularly to the disclosure in the drawing wherein is shown illustrative embodiments of the present invention, FIG. 1 discloses the outer open end 10 of the leg of a metal chair base for an office or other chair having a ball bearing caster 11 mounted in a caster socket 12, the latter being secured to the open end 10 of the leg of the chair base, as by welding 13; the socket and open end of the chair leg being covered by a suitable protective shield 14, preferably formed of a resilient abrasion resistant plastic.

The caster 11, as shown, includes a caster wheel 15 mounted on an axial 16 located in a hood or other suitable mounting 17. The hood 17 and its contained wheel are swiveled on the base 18 for a stem 19 with a ball bearing race 21 separating and providing free rotation of the mounting 17 and caster wheel 15 relative to the base 18. The stem is generally cylindrical and provided with an annular groove 22 adjacent its upper end 23 to receive a friction ring 24 of the spring ring type to detachably anchor the stem in its socket.

The socket 12 is a one-piece member having concentric inner and outer cylindrical walls 25 and 26, respectively; the walls being spaced along their length by a pair of oppositely and radially extending webs 27 integral with the walls. Furthermore, the walls 25, 26 are joined at their upper ends by an inverted generally U-shaped portion 28. The chair leg end 10 is secured to the socket 12 by welding at 13 with the lower edge 29 of the outer wall 26 substantially flush with the lower edge of the chair leg end 10.

The caster stem 19 is conformably received in th central passage 31 formed by the inner wall 25 with the lower edge 32 of the inner wall 25 abutting the enlarged base 18 of the caster. The spring friction ring 24, formed of a suitable material such as brass, is positioned in the groove 22 and frictionally engages the internal surface of the inner wall 25 to retain the caster stem therein with the end 23 of the stem substantially flush with the U-shaped connecting portion 28 of the socket 12.

In FIGS. 5–8, a second embodiment of a caster socket is shown utilizing a two-piece socket 33 formed of two halves 34 having their abutting ends welded together. The two halves or cups 34 each have a generally cylindrical outerwall 35 and a generally cylindrical inner wall 36 forming a central passage 37. The inner and outer concentric walls are joined by a generally U-shaped connecting portion 38 and the inner wall 36 terminates in a slightly outwardly flared edge 39 short of the lower edge 41 of the extended outer wall 35.

To form the socket 33, the two cups are positioned with the edges 41 of the outer walls abutting and the cups are welded together as at 42. Then the socket 33 is welded to the open end 10' of the chair base leg as at 43. The flared edges 39 of the inner walls 36 of the socket are axailly spaced apart as shown in FIGS. 5 and 6 with the flared edges guiding the stem 19' of the caster 11' when the stem is received in the axially aligned central passages 37, 37 of the socket halves 34, 34. The U-shaped connecting portion 38 of the lower cup or half 34 projects slightly below the lower edge of the chair leg end 10' and abuts the base 18' of the caster 11'. The friction ring 24' on the stem 19' frictionally engages the interior surface of the inner wall 36 of the upper half 34 with the end 23' of the stem 19' being substantially flush with the U-shaped connecting portion 38 of the upper half or cup 34.

While a caster and caster socket assembly of a partic-

Having thus described my invention, I claim:

1. A caster socket assembly adapted to be secured to the open end of a chair leg of an office chair base and to receive the stem of a ball bearing caster, comprising a caster socket having a generally cylindrical outer wall and a spaced concentric generally cylindrical inner wall receiving the stem, said inner and outer cylindrical walls being of the same axial length and joined at one end by a generally U-shaped connecting portion, said outer cylindrical wall being secured along its length to the open end of the chair leg.

2. A caster socket assembly adapted to be secured to the open end of a chair leg of an office chair base and to receive the stem of a ball bearing caster, comprising a caster socket having a generally cylindrical outer wall and a spaced concentric generally cylindracl inner wall receiving the stem, said inner and outer cylindrical walls being joined at least at one end by a generally U-shaped connecting portion, radially extending webs connecting the inner and outer cylindrical walls for the axial length of the socket, said outer cylindrical wall being secured to the open end of the chair leg.

3. A caster socket assembly as set forth in claim 2, in which the lower edge of the caster socket is substantially flush with the lower edge of the end of the chair leg.

4. A caster socket assembly adapted to be secured to the open end of a chair leg of an office chair base and to receive the stem of a ball bearing caster, comprising a caster socket having a generally cylindrical outer wall and a spaced concentric generally cylindrical inner wall receiving the stem, said socket being formed of a pair of socket halves, each half having concentric inner and outer walls joined at one end by a generally U-shaped connecting portion, the edges of the outer walls of the socket halves opposite the U-shaped connecting portions being welded together in abutting relation to form the socket, said outer cylindrical wall being secured to the open end of the chair leg.

5. A caster socket assembly as set forth in claim 4, which the inner wall of each socket half terminates short of the lower edge of the outer wall in an outwardly flared edge.

6. A caster socket assembly as set forth in claim 4, in which said socket formed of the two socket halves has a U-shaped connecting portion at each end and the inner walls are axially spaced apart at their flared edges.

References Cited

UNITED STATES PATENTS

| 1,186,296 | 6/1916 | Diss | 16—43 |
| 1,691,716 | 11/1928 | Herold | 16—29 |

FOREIGN PATENTS 648,155  12/1960  Great Britain.

BOBBY R. GAY, *Primary Examiner.*

D. L. TROUTMAN, *Assistant Examiner.*

U.S. Cl. X.R.

16—43; 248—188.9